United States Patent
Ali et al.

(10) Patent No.: US 8,626,734 B2
(45) Date of Patent: *Jan. 7, 2014

(54) APPLICATION LAUNCHING VIA INDEXED DATA

(75) Inventors: Hyder Ali, Cupertino, CA (US); Dane Alexander Glasgow, Los Gatos, CA (US); David Anton Walters, Sunnyvale, CA (US); David Dawson, Seattle, WA (US); Marek Gorecki, Palo Alto, CA (US); Neel I. Murarka, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/770,518

(22) Filed: Apr. 29, 2010

(65) Prior Publication Data

US 2010/0211587 A1    Aug. 19, 2010

Related U.S. Application Data

(63) Continuation of application No. 11/159,821, filed on Jun. 23, 2005, now Pat. No. 7,720,834.

(51) Int. Cl.
*G06F 7/00* (2006.01)
*G06F 3/00* (2006.01)

(52) U.S. Cl.
USPC .......................... 707/706; 707/765; 715/700

(58) Field of Classification Search
USPC ........... 707/766, 758, 759, 706; 715/500, 700
See application file for complete search history.

(56) References Cited

U.S. PATENT DOCUMENTS

| 5,201,048 A | 4/1993 | Coulter et al. |
| 5,303,361 A | 4/1994 | Colwell et al. |
| 5,691,744 A | 11/1997 | Anstotz et al. |
| 6,021,412 A | 2/2000 | Ho et al. |
| 7,051,019 B1 * | 5/2006 | Land et al. ............................. 1/1 |
| 7,143,160 B2 | 11/2006 | Tamaki |
| 7,225,187 B2 | 5/2007 | Dumais et al. |
| 7,305,381 B1 | 12/2007 | Poppink et al. |
| 7,350,191 B1 | 3/2008 | Kompella et al. |
| 7,370,276 B2 | 5/2008 | Willis |
| 7,437,358 B2 * | 10/2008 | Arrouye et al. ....................... 1/1 |
| 7,441,194 B2 | 10/2008 | Vronay et al. |
| 7,720,834 B2 * | 5/2010 | Ali et al. ....................... 707/706 |

(Continued)

OTHER PUBLICATIONS

Unknown, "Spotlight," Nov. 2004, Apple—Mac OS X—Spotlighthttp://www.apple.com/macosx/features/spotlight/, 3 pgs.

(Continued)

*Primary Examiner* — Hung T Vy
(74) *Attorney, Agent, or Firm* — Senniger Powers LLP

(57) ABSTRACT

Application launching on a computer via indexed data. Based on a search term entered by a user, the computer searches an index containing metadata representative of one or more applications installed on the computer. A user interface on the computer's display has a window for displaying the results of searching the index. In addition, the user interface receives user input to select an application from the search results to be initiated. The computer is responsive to the user input via the user interface for initiating the selected application installed on the computer. A computer-readable medium including a persistent component, an index component, a query component, and an execution component embodies further aspects of the invention.

16 Claims, 5 Drawing Sheets

(56) References Cited

U.S. PATENT DOCUMENTS

| | | | |
|---|---|---|---|
| 7,788,248 B2* | 8/2010 | Forstall et al. | 707/706 |
| 7,890,526 B1* | 2/2011 | Brewer et al. | 707/767 |
| 2003/0130994 A1* | 7/2003 | Singh et al. | 707/3 |
| 2004/0061720 A1 | 4/2004 | Weber | |
| 2004/0143569 A1 | 7/2004 | Gross et al. | |
| 2004/0267730 A1 | 12/2004 | Dumais et al. | |
| 2005/0055337 A1 | 3/2005 | Bebo et al. | |
| 2005/0097089 A1* | 5/2005 | Nielsen et al. | 707/3 |
| 2005/0138002 A1 | 6/2005 | Giacobbe et al. | |
| 2005/0289111 A1 | 12/2005 | Tribble et al. | |
| 2005/0289133 A1 | 12/2005 | Arrouye et al. | |
| 2006/0074980 A1* | 4/2006 | Sarkar | 707/104.1 |
| 2006/0080306 A1 | 4/2006 | Land et al. | |
| 2006/0106769 A1* | 5/2006 | Gibbs | 707/3 |
| 2006/0206454 A1* | 9/2006 | Forstall et al. | 707/3 |
| 2006/0236216 A1* | 10/2006 | Blackwell | 715/500 |

OTHER PUBLICATIONS

Cole, Bernard, "Search Engines Tackle the Desktop," Mar. 2005, IEEE Computer Society, pp. 14-17.

Cusumano, Michael, "Google: What It Is and What It Is Not," Feb. 2005, Communications of the ACM, vol. 48, No. 2, pp. 15-17.

* cited by examiner

APPLICATION LAUNCHING VIA INDEXED DATA

CROSS REFERENCE TO RELATED APPLICATION

This application is a continuation of U.S. patent application Ser. No. 11/159,821, filed Jun. 23, 2005, the entire disclosure of which is hereby incorporated by reference.

BACKGROUND

Currently available computer operating systems use a "Start" menu for launching applications installed on a computer. The Start menu typically lists recently accessed programs. In addition, an "All Programs" option of the Start menu permits a user to navigate through multiple submenus to locate a program he or she wishes to open. The user then clicks on an appropriate user interface element to open the selected program. If a particular program does not appear on the Start menu or one of its submenus, the user may need to search for the program on the computer's hard drive. A typical Start menu also includes a "Favorites" section, which enables the user to open favorite Web sites and the like.

Unfortunately, the Start menu can become quite unwieldy over time as more and more applications are installed on the computer. The Start menu can easily consume an entire screen length and often has multiple columns and submenus. As such, many useful applications can become buried in several layers of menus, which make them very difficult to locate and launch.

SUMMARY

Embodiments of the invention overcome one or more deficiencies in known systems by permitting a user to easily access and run software applications on his or her computer. Aspects of the invention provide an index of applications using desktop search functionality, which in part allows the user to quickly and easily search for a desired application to be launched in much the same manner as searching for a text document or e-mail. When items are retrieved by the desktop search engine, they are enabled for launching (e.g., right-click enabled) directly from the results window user interface. In addition, aspects of the invention improve search efficiency, the relevance of search results, and the user experience with a search tool that is "lighter," customizable, and more aesthetically pleasing to the user. In this regard, an embodiment of the invention automatically scopes search results, partitions the results by file type, and presents a consistent interface across different contexts.

Computer-readable media having computer-executable instructions for performing a method of launching applications embody further aspects of the invention.

Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
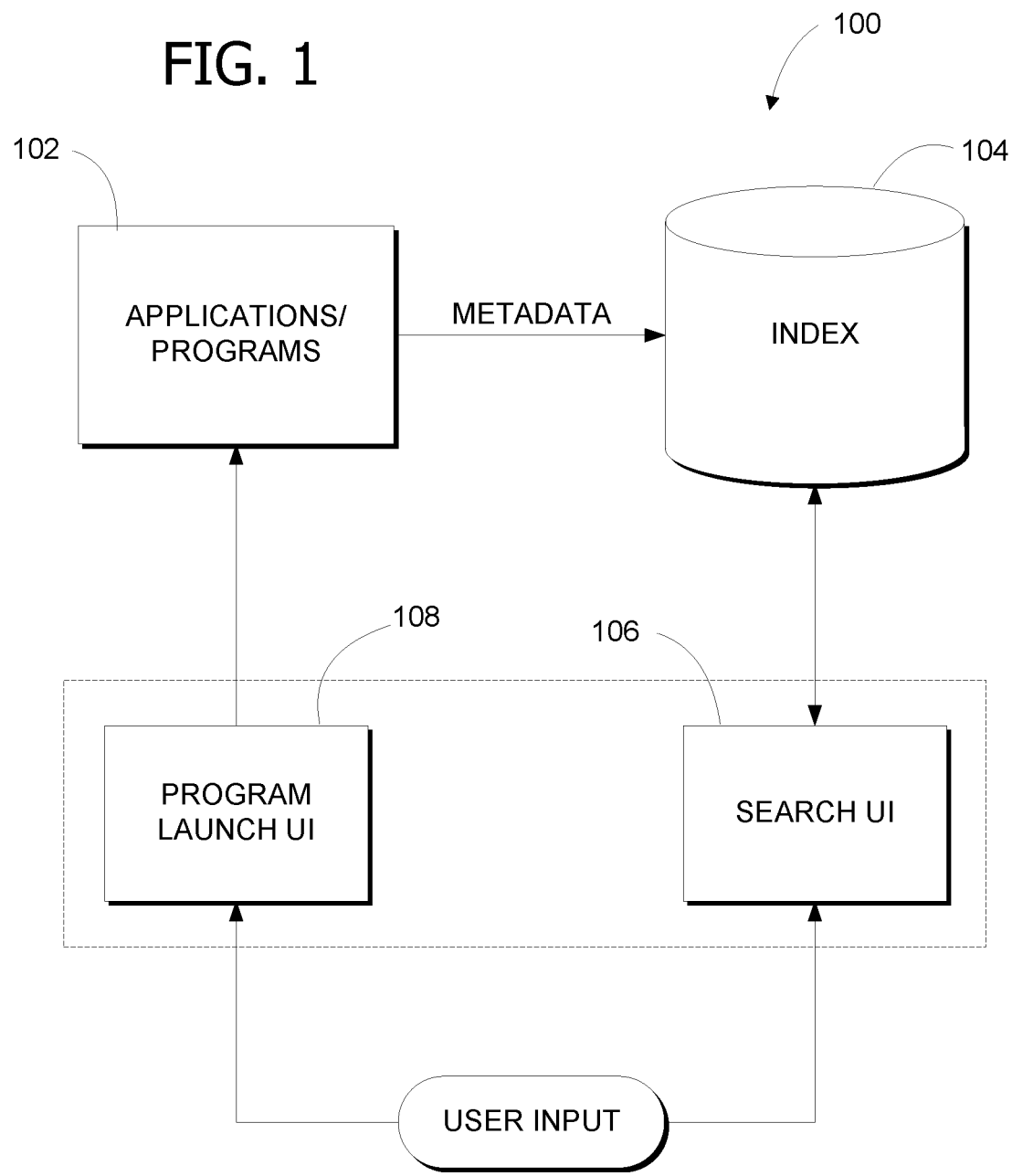
FIG. 1 is a block diagram illustrating components of an exemplary computer system implementing an embodiment of the invention.

Referring now to the drawings, FIG. 1 illustrates components of an exemplary computer system 100 implementing an embodiment of the invention. Aspects of the invention allow a user of computer system 100 to easily access and run software applications 102, or programs, on a computer. An index 104 contains metadata associated with the applications 102 installed on the computer, which simplifies the task of locating and initiating a particular application. In one embodiment, desktop search functionality, such as provided by Microsoft Corporation's MSN® Toolbar Suite, helps users quickly find virtually any type of document, media file or e-mail message on their computers. This search functionality identifies keywords within files as well as within their titles. In other words, the index 104 permits the user to search for a particular application 102 in much the same manner as searching for a text document or e-mail. One example of metadata is the file type of the indexed item.

In general, desktop searching may refer to the ability to search multiple data sources (e.g., the Internet, corporate intranets and databases, hard drives and removable storage on the user's computer) from a search term entered into a text box or other form of search field on the computer desktop. Many user activities performed during the course of normal computer usage may be accomplished by searching the desktop contents. Advantageously, desktop searching according to aspects of the invention returns desired results quickly enough to produce a significant productivity increase and permits the user to launch a separate application directly from the search results.

Referring further to FIG. 1, a persistent user interface (UI) element 106 remains on the desktop for accessing information in index 104 and providing results based on partial matches of one or more characters input by the user. In this manner, the UI element 106 is available in the computer's operating system shell as well as hosted in various applications. This significantly reduces repeated mouse clicks and keystrokes. In addition to metadata associated with applications 102, the index 104 contains metadata for browser favorites, recent documents, and operating system shell namespace (e.g., for printers, connections, etc.).

Aspects of the present invention also provide a second UI element 108 (see FIG. 3) for displaying results of the search. In order to provide useful results as soon as possible, one embodiment of the invention modifies the query term input in UI element 106 by, for example, appending a wildcard operator and filtering the most appropriate data types. Filtering in this manner to narrow the scope of the search vastly improves the speed of the search. Given the limited screen space available for display, one embodiment also prunes the results by limiting them to certain document types depending on the search and grouping relevant items by task. Advantageously, the user may customize these groupings. By determining a user's intended search scope without explicit user designation or selection, aspects of the invention improve search efficiency and the relevance of search results by providing a search tool that is 'lighter,' customizable, and more aesthetically pleasing to the user. In one embodiment, the invention determines search scope by "predicting" the user's intended search scope based on the context of his or her current application.

The second UI element 108, although referred to as a program launch UI, is optimized to perform numerous repetitive tasks such as launching programs, looking up contacts, e-mails, etc. In addition, items retrieved by the desktop search engine may be right-click enabled and provide the user with generally the same options as the Start menu.

The UI element 108 may be embodied by a "Word Wheel," that is, a pop-up window providing a summary of results from desktop search queries as the user types. The Word Wheel, in one embodiment, permits the user to open items, launch applications, right-click for extra context-menu information, without having to launch a separate application or window. As the user types, the summarized view in UI element 108 suggests possible results based on the user's input, and provides access to these results without launching a full, detailed, results window.

Figure 2:
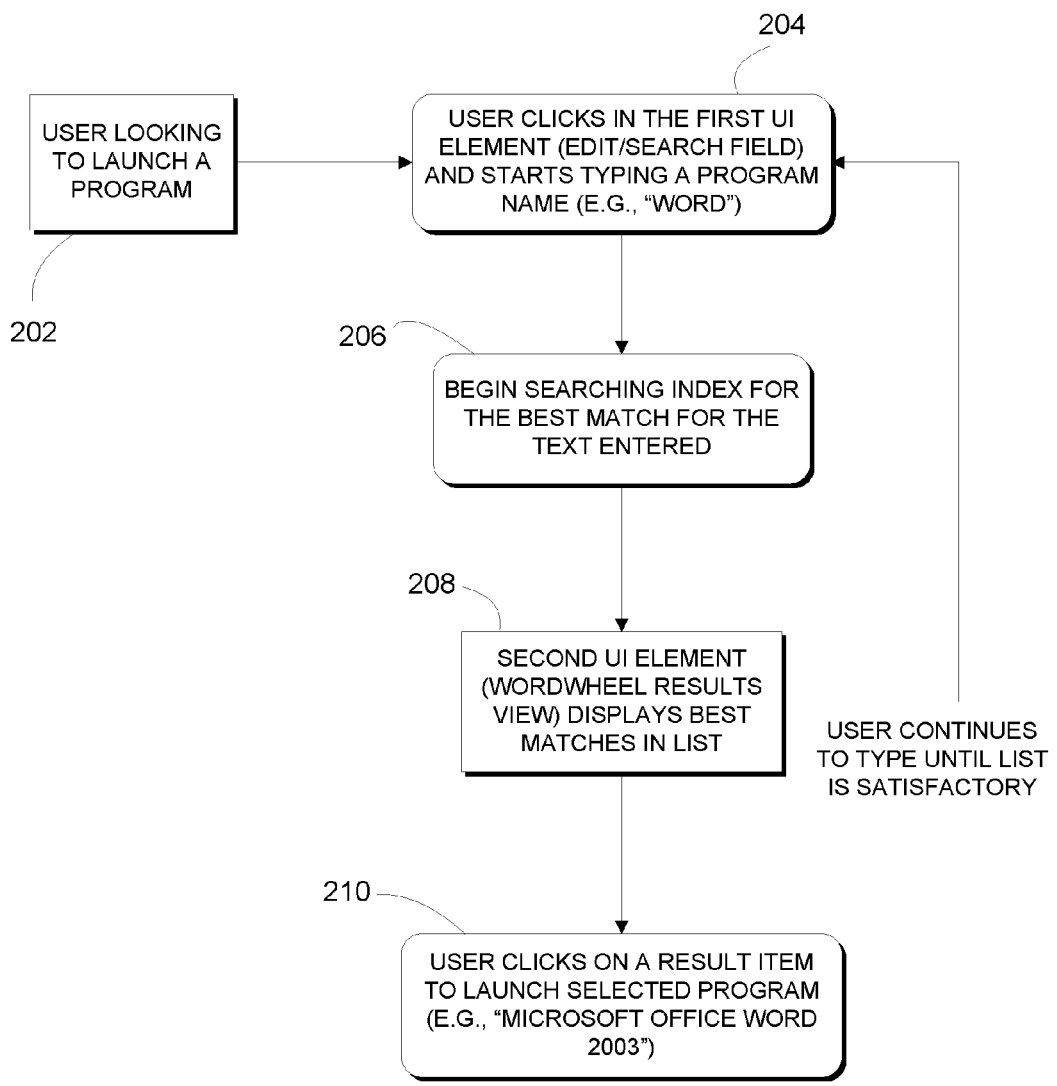
FIG. 2 is an exemplary flow diagram illustrating search and launch operations according to an embodiment of the invention.

FIG. 2 is an exemplary flow diagram illustrating search and launch operations according to an embodiment of the invention. In the example of FIG. 2, the user wishes to launch a word processing program, such as Microsoft® Word available from Microsoft Corporation. Beginning at 202, the user desires to launch a program 102. At 204, the user clicks in the first UI element 106 (e.g., a desktop edit/search field) and starts typing a program name (e.g., "word"). Searching of index 104 begins at 206 to identify the best match for the text entered by the user. At 208, embodiments of the invention provide the second UI element 108 (e.g., a Word Wheel results view) to display the best matches in a relatively simple, clean list. The user may continue to type additional characters of the search term until the list is satisfactory. At 210, may click on a selected result item to launch the desired program 102 (e.g., Microsoft® Office Word 2003).

Figure 3:
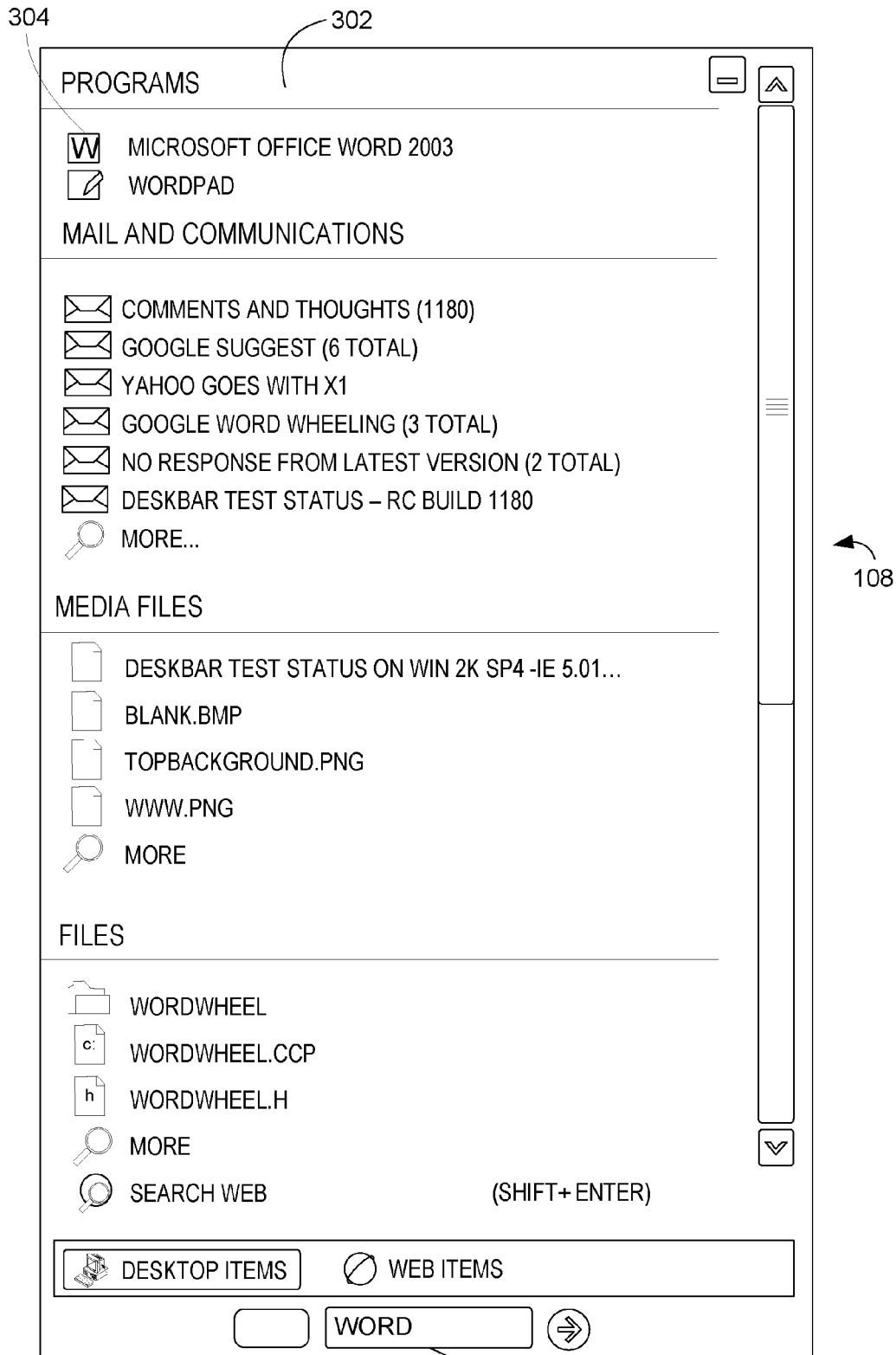
FIG. 3 is an exemplary screen shot illustrating a user interface according to an embodiment of the invention.

Referring now to FIG. 3, an exemplary screen shot illustrates a user interface according to an embodiment of the invention. In FIG. 3, UI element 106 provides the user with instant search access to information on his or her computer as well as the Internet. In one embodiment, the query box of UI element 106 uses "word wheeling" to dynamically display results in UI element 108 as the user begins typing a search term. For example, as a user types "w-o-r-d" into the search box, he or she quickly sees a list of any desktop applications that contain the letter "w" and a list of Internet search results for the search term. The search results automatically, and quickly, update as the user types additional characters; first "w", then "wo", then "wor", and finally the complete search term "word". At any time, the user may stop typing and select the desired application for launching from UI element 108. In one embodiment, the default search scope is set to the computer's hard drive and includes local files and e-mail. As described above, the desktop search tool provides persistence because it resides in the taskbar.

As shown in the embodiment of FIG. 3, the UI element 108 partitions the search results by file type (e.g., Program/Application, Browser Favorites, Contacts, etc.). These items are displayed as subgroups in a Word Wheel window in the illustrated embodiment. According to aspects of the present invention, the Word Wheel UI element 108 enables the user to easily find and launch a selected application 102 installed on the computer. For example, to launch an application, the user types its title (or a portion of the title) in the desktop search field UI 106 and then clicks on the appropriate result shown in UI element 108 to launch the application. In the alternative, the user can navigate the search results with the keyboard's arrow keys and "enter" on the desired result item as a means for selecting the desired application to be launched.

In one embodiment, UI element 108 groups the results by type (e.g., applications, documents, contacts, e-mail) and lists up to a predetermined number of result items for each type. In an alternative embodiment, the invention allows the user to specify which result types will be displayed in the Word Wheel UI element 108. For example, a user can choose to only display applications. In this manner, UI element 108 presents a diverse set of search results in a single, unified UI. Advantageously, the individual search results UIs are consistent with each other even though the searches may have been performed in different scopes or contexts. The similarity and familiarity of the results interfaces improves search efficiency.

One implementation of the invention is as follows. Applications, IE Favorites, My Recent Documents are stored as folders and files under C:\Documents and Settings\All Users\ and C:\Documents and Settings\<current logged in user>\. Using the indexer in the desktop search tool, indexes these data elements so they can be queried in meaningful ways to the user.

Figure 4:
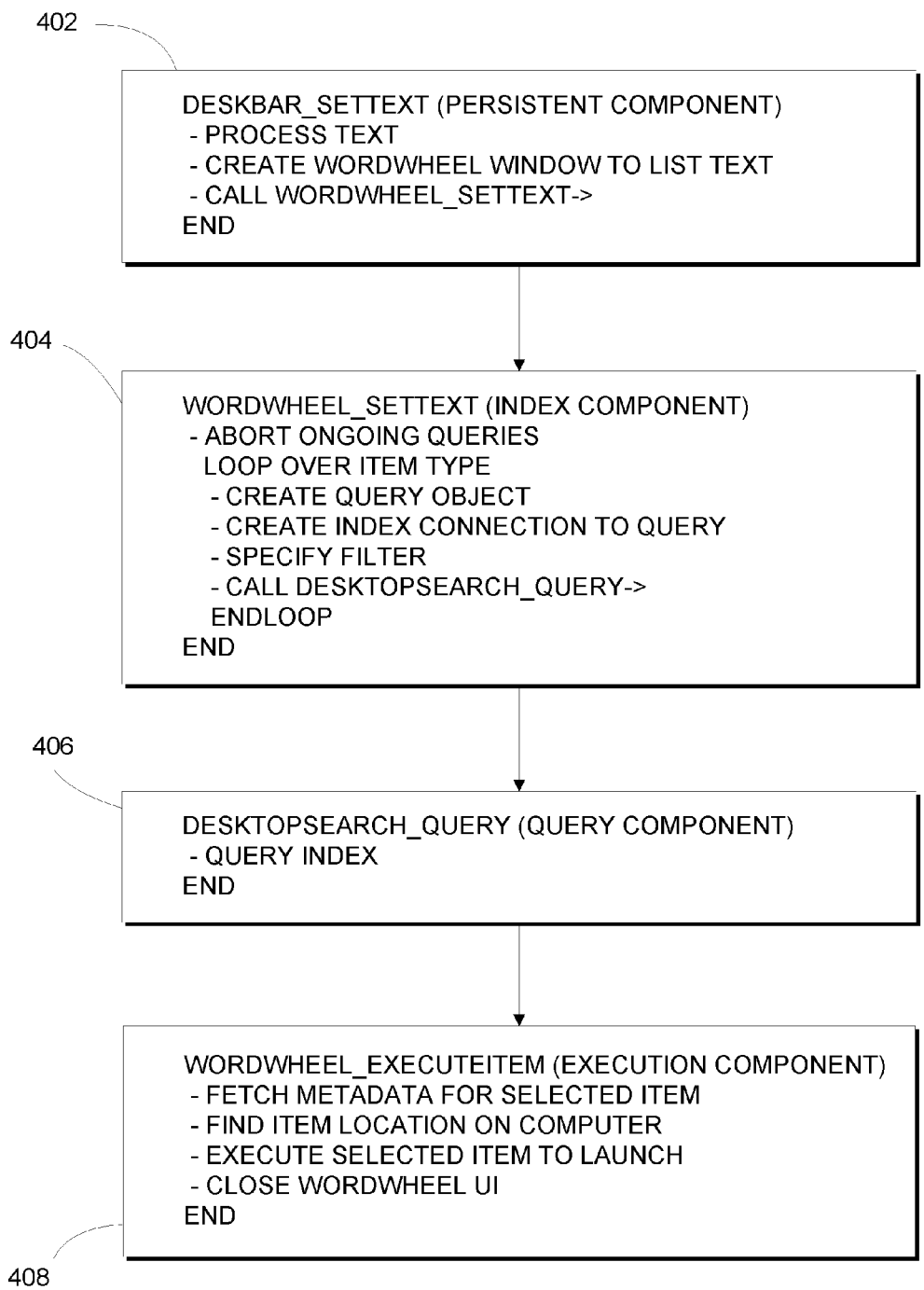
FIG. 4 is an exemplary flow diagram illustrating computer-executable instructions according to an embodiment of the invention.

FIG. 4 is an exemplary flow diagram illustrating computer-executable instructions in the form of pseudocode according to an embodiment of the invention. In FIG. 4, the pseudocode explains the process that an embodiment of the invention may follow to perform queries against a desktop search index and launch tasks from those queries. The illustrated process is initiated by the user typing one or more characters into a persistent UI search field (e.g., UI element 106). Reference character 402 indicates a persistent component (Deskbar_SetText), reference character 404 indicates an index component (Wordwheel_SetText), reference character 406 indicates a query component (DesktopSearch_Query), and reference character 408 indicates an execution component (Wordwheel_ExecuteItem).

```
Deskbar_SetText
    Process the text the user typed
    Create a Wordwheel Window to list the text
    Call Wordwheel_SetText ->
End
Wordwheel_SetText
    Abort any on-going queries into any active Desktop Search
    Connection
        LOOP over each Item type (Programs, Email, Files, Media, etc.)
        Create a Query object with the text the user typed
        Create a Desktop Search Index connection to query for data
        Specify a filter in the connection to query on specific type of
        data (Programs, Email, Files, etc.)
        Call DesktopSearch_Query ->
        ENDLOOP
End
DesktopSearch_Query
    Query the Desktop Search index on the user's query text and filter
    specified
End
Wordwheel_ExecuteItem
    Fetch the metadata for a result item that the user clicked on.
    Find the item location on the computer
    Execute the item to launch the application/file/shortcut/etc.
    Close the Wordwheel UI
End
```

In the example of FIG. 4, DesktopSearch_Query is repeated for every letter typed and Wordwheel_ExecuteItem is responsive to input from the user, such as the user clicking on a result item, to select an application for launching.

Figure 5:
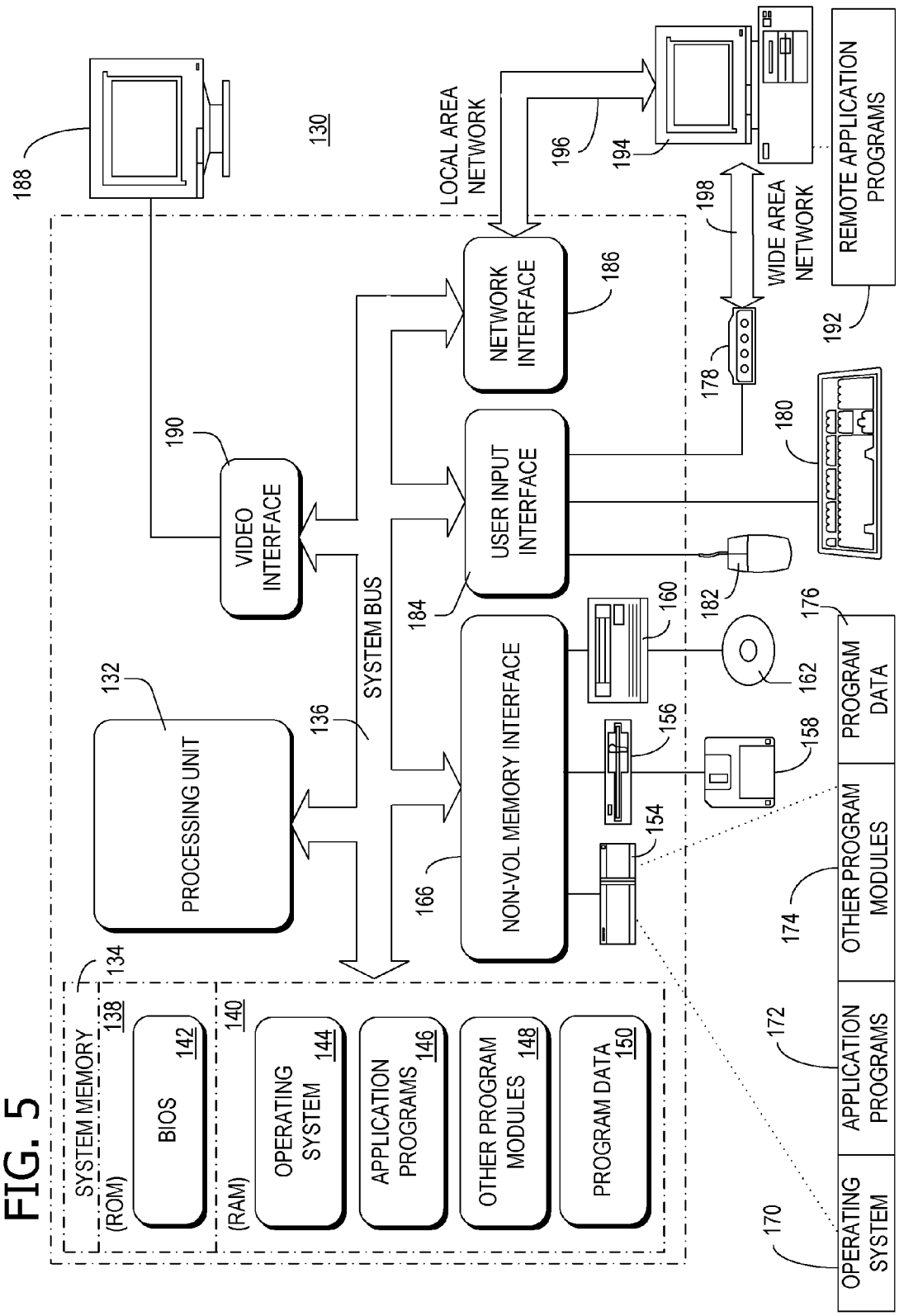
FIG. 5 is a block diagram illustrating an exemplary embodiment of a suitable computing system environment in which an embodiment of the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMl) interfaces (e.g., for communication between web services).

The interface may be a tightly coupled, synchronous implementation such as in Java 2 Platform Enterprise Edition (J2EE), COM, or distributed COM (DOOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation according to one embodiment of the invention, computer 130 locates and initiates an application 102 installed on the computer by displaying a first user UI element 106 to a user. The UI element 106 includes a search field for receiving a user-entered search term. In this instance, the search term may be one or more characters representing an application to be initiated on the computer 130. Computer 130 executes computer-executable instructions to search, based on the search term, index 104. As described above, index 104 contains metadata representative of one or more applications 102 installed on the computer. Computer 130 then displays a second UI element 108, which includes a window for displaying the search results and for receiving user input to select the application to be initiated. According to aspects of the invention, computer 130 is responsive to user input via the second UI element 108 for initiating the selected application. Advantageously, the computer 130 continually updates the search results as the user enters additional characters of the search term.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

The invention claimed is:

1. A computerized method of locating and opening a file on a computer, said computer including an index containing metadata associated with one or more files stored on the computer or on an external source, said metadata identifying a type of each of the one or more files, said method comprising:
   initiating a current application on the computer;
   initiating a desktop search application on the computer, said initiating the desktop search application comprising:
      displaying to a user of the computer a persistent first user interface (UI) element that is persistently available to a user of the computer by being located in an operating system shell of an operating system of the computer, said persistent first UI element including a search field for receiving a user-entered dynamically modifiable search term, said search term comprising one or more characters representative of a file to be opened on the computer, said search term being dynamically modifiable as the user enters additional characters, wherein each file is indexed according to the file type identified in the metadata associated with the file;
      dynamically modifying the user-entered dynamically modifiable search term as the user enters one or more search operators to the search term;
      dynamically defining a scope of the index of files to be searched based on the user-entered dynamically modifiable search term, wherein the scope of the index is dynamically modified as the one or more search term search operators are dynamically modified;
      in response to the received dynamically modifiable search term, dynamically searching the index of files by file type, as identified by the metadata associated with each file, and based on the defined scope of the index according to the dynamically modified search term;
      generating search results in response to searching the metadata associated with each file based on the dynamically modified search term, said generated search results having a plurality of files having a plurality of types;
      dynamically filtering the generated search results according to each type of file listed in the search results; and
      displaying a second UI element associated with the first persistent UI element, said second UI element including a window for displaying the filtered search results based on the scope of the index, said second UI element receiving user input to select the file to be opened from the filtered search results, and wherein said computer is responsive to said user input via the second UI element for opening the selected file.

2. The method of claim 1, wherein the second UI element comprises a window for summarizing the search results.

3. The method of claim 2 wherein initiating the desktop search application further comprises organizing the search results in the window of the second UI element into groups according to the file type.

4. The method of claim 1, wherein searching comprises filtering the search results by the file type.

5. The method of claim 1, wherein the file type comprises one or more of the following: application, document, browser favorite, contact, email.

6. The method of claim 1, wherein searching comprises modifying the search term by automatically appending a wildcard operator to the one or more characters received from the user.

7. The method of claim 1 wherein initiating the desktop search application further comprises enabling the search results for one or more right-click operations.

8. The method of claim 1 wherein initiating the desktop search application further comprises enabling the search results for launching directly from the second UI element.

9. The method of claim 1, wherein one or more computer-readable storage media have computer-executable instructions for performing the method recited in claim 1.

10. The computerized method of claim 1, wherein accessing the index to dynamically search the metadata comprises searching multiple data sources.

11. The computerized method of claim 10, wherein each of the multiple data sources comprises at least one of the following: the internet, a corporate intranet, a corporate database, a hard drive, and a removable storage connected to the user's computer.

12. A computer-readable storage medium having computer-executable instructions for a desktop search program for locating and opening a file on a computer, said computer including an index containing metadata representative of one or more files stored on the computer or on an external source, said metadata identifying a type associated with each of the one or more files associated with the one or more applications, said computer-readable medium comprising:
   a persistent component responsive to a search term received from a user for processing a query, said query comprising one or more characters representative of a desired file on the computer to be opened, said query being dynamically modified as the user enters additional characters and search operators, said persistent component listing the one or more characters and search operators in a user interface element for receiving the query from the user, said persistent component being persistently available to the user of the computer by being located in an operating system shell of an operating system of the computer, said user interface element residing in a taskbar of the operating system of the computer;
   an index component called by the persistent component for creating a query object with the query received from the user and creating a connection to the search index to query for metadata associated with a file as a function of the query;
   a current application component dynamically defining a scope of the index as the query is being dynamically modified with one or more search operators as the user enters additional characters, wherein said query is repeated as each of the one or more characters and search operators is input to the user interface element; and
   a query component called by the index component for querying the dynamically defined scope of the index according to the created query object, wherein the scope of the index is dynamically modified as the query is dynamically modified;
   wherein said query component generates search results in response to the querying and the determining of the query object, said generated search results having a plurality of files having a plurality of types, wherein the query component further dynamically filters the generated search results according to each type of file listed in the generated search results;

an execution component responsive to a user selection of a file from the filtered search results based on the scope of the index, and said execution component for fetching metadata for the selected item for displaying in an user interface element.

13. The computer-readable storage medium of claim 12, wherein the index component includes instructions for specifying a filter associated with the query as a function of a specific type of data.

14. The computer-readable storage medium of claim 12, wherein the query component queries the index for each additional character of the query received from the user.

15. A computerized method comprising:

displaying to a user of a computer a persistent first user interface (UI) element that is persistently available to the user of the computer by being located in an operating system shell of an operating system of the computer, said persistent first UI element being presented on the desktop of the computer via a display of the computer, said persistent first UI element including a search field for receiving a user-entered dynamically modifiable search term, said computer including an index containing metadata representative of one or more applications installed thereon, said index further containing metadata representative of the one or more files associated with the one or more applications stored on the computer or on an external source;

dynamically modifying the user-entered dynamically modifiable search term by dynamically modifying one or more search term operators;

executing a desktop searching application for dynamically defining a scope of the index based on dynamically modifying the user-entered search term operators, said executed desktop searching application searching for the one or more files, based on the defined scope of the index, wherein the scope of the index is dynamically modified as the search term is dynamically modified;

in response to the received dynamically modifiable search term, dynamically searching the dynamically defined scope of the index based on the dynamically modified search term, and accessing, by the persistent UI element, the index to dynamically search the metadata associated with the index based on the dynamically modified search term;

generating search results in response to the searching of the metadata and the determining based on the dynamically modified search term, said generated search results having a plurality of files having a plurality of types, wherein the metadata identifies a file type, said file type associated with each of the one or more files;

dynamically filtering the generated search results according to the metadata for each type of file listed in the search results; and displaying a second UI element associated with the first persistent UI element to the user via the display of the computer, said second UI element including a window for displaying filtered results of searching, said second UI element receiving user input to select one or more files to be opened from the filtered search results, and wherein said computer is responsive to user input via the second UI element for opening the selected file.

16. The computerized method of claim 15 wherein said searching one or more files includes searching for keywords within the files and titles of the files.

* * * * *